Nov. 1, 1932.  R. J. WEISSER  1,885,787
MOTOR SLED
Filed Oct. 2, 1929  2 Sheets-Sheet 1
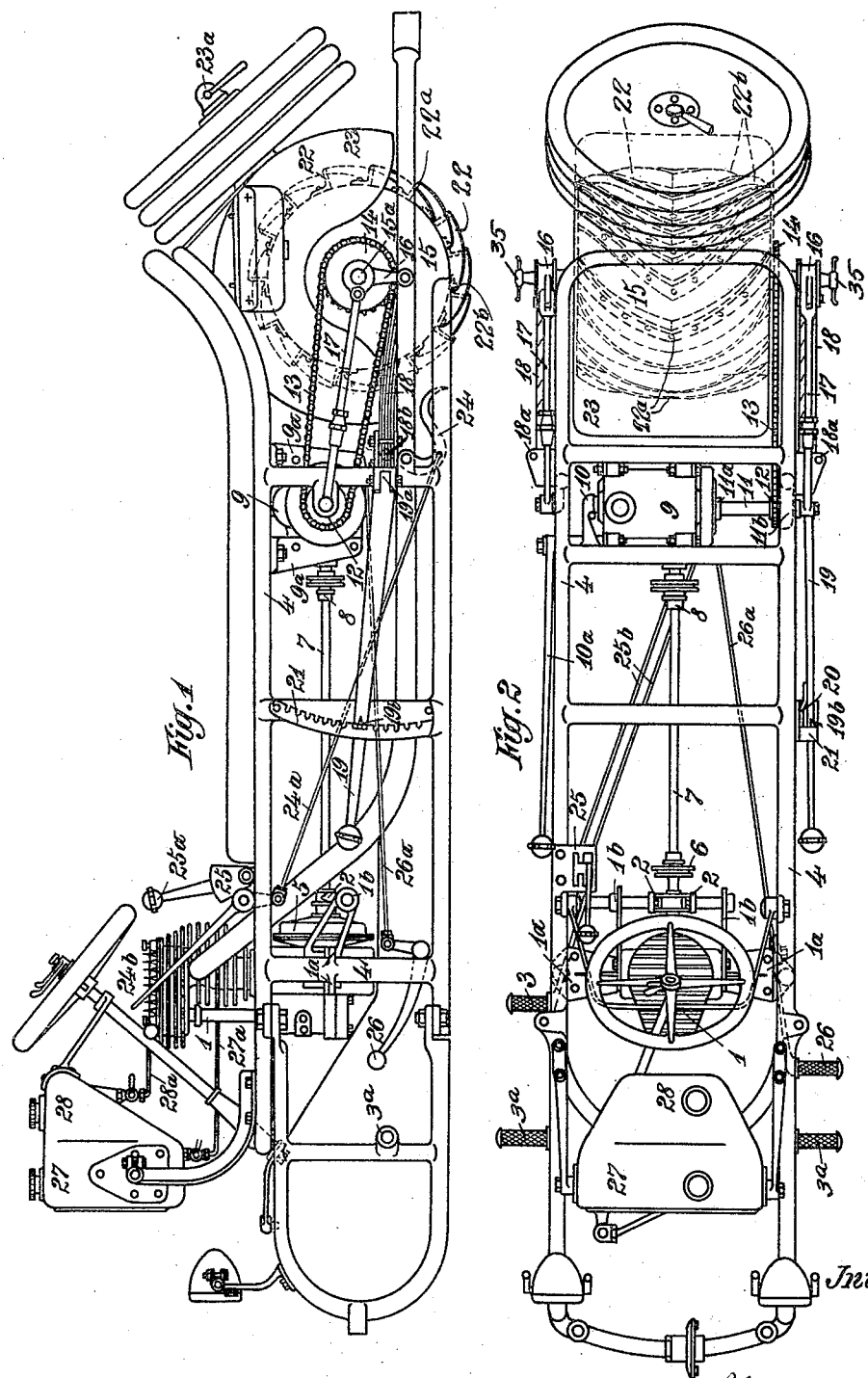
Inventor:
Richard Joseph Weisser Nov. 1, 1932.  R. J. WEISSER  1,885,787
MOTOR SLED
Filed Oct. 2, 1929   2 Sheets-Sheet 2

Inventor:
Richard Josef Weisser

Patented Nov. 1, 1932

1,885,787

UNITED STATES PATENT OFFICE

RICHARD JOSEF WEISSER, OF BRAUNAU, CZECHOSLOVAKIA

MOTOR SLED

Application filed October 2, 1929. Serial No. 396,763.

This invention relates to a novel motor sled and has for its object to make it possible to utilize also in winter the benzine motor generally used on motor-cars. A special feature of the invention is the construction of the roller of the sled which serves to propel the same, and further the use of motor-car wheels for propelling the slide on roads free from snow.

An embodiment of the invention is illustrated by way of example in the accompanying drawings in which:—

Figure 3:
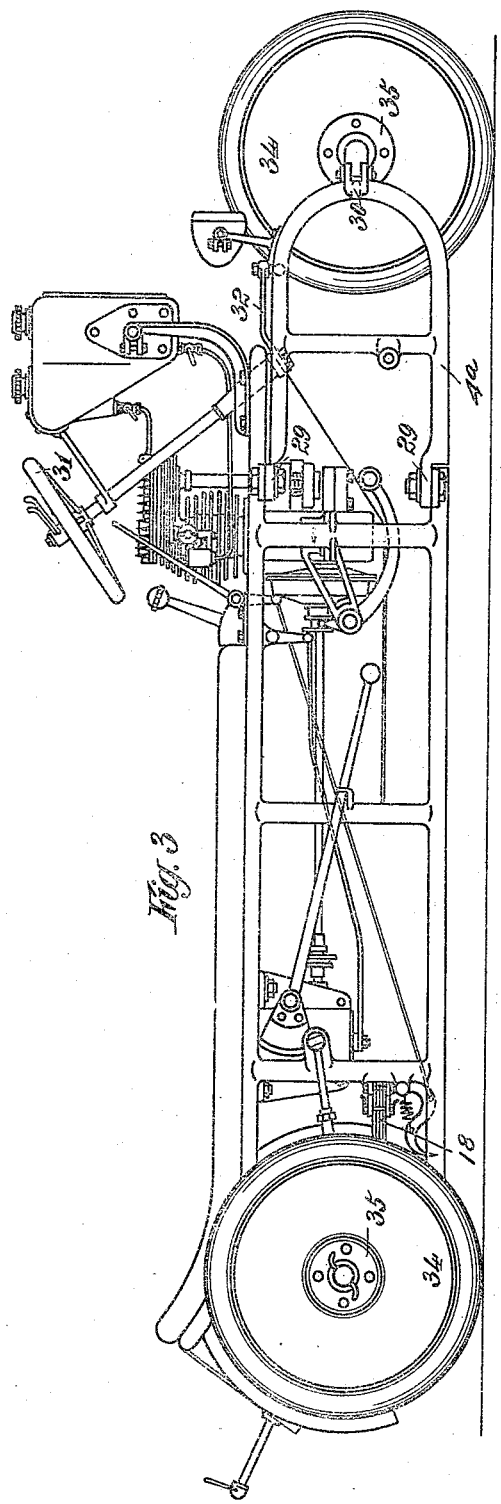
Figure 4:
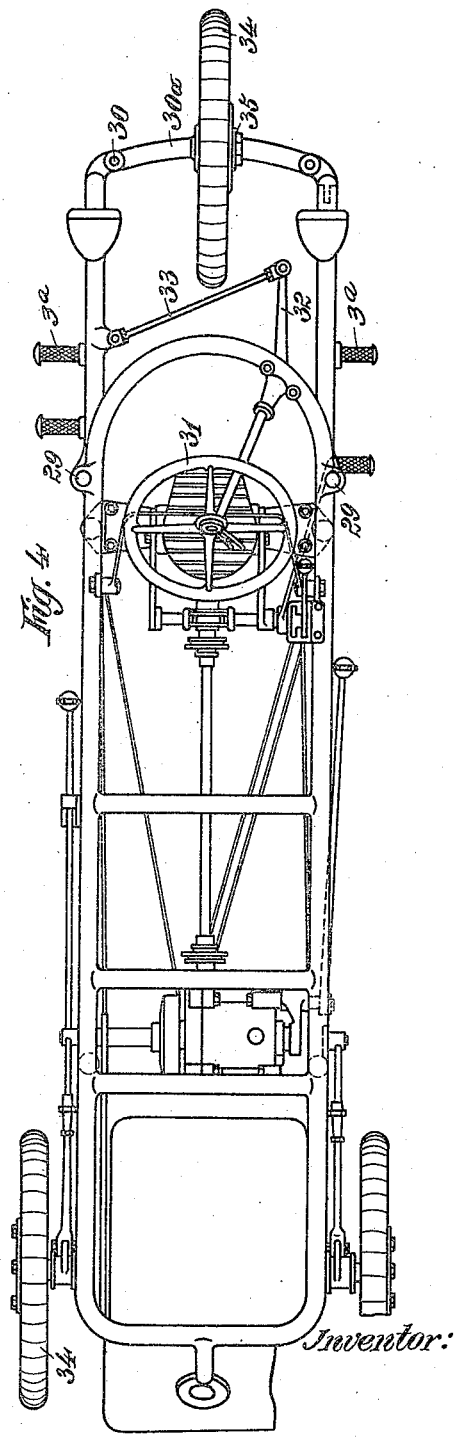

Fig. 1 is a left side elevation of the sled.
Fig. 2 is a top plan view of the sled.
Fig. 3 is a right side elevation of the sled with motor-car wheels fitted on the same.
Fig. 4 is a top plan view of Fig. 3.

Referring to Figs. 1 and 2 the motor 1 is removably fixed in the frame 4 by means of angle straps 1a which at the points 1b serve as supports for a coupling lever 2 and for a coupling pedal 3. A clutch 5 is connected by a Hardy joint 6 to a Cardan shaft 7, said shaft being connected by a Hardy joint 8 to the transmission gear 9. The transmission gear 9 is mounted in the frame by angle straps 9a and it comprises three forward speeds and one reverse speed and a brake and it is specially constructed for Cardan drive and chain transmission. The usual starter mechanism for the motor 1 is employed, 10 being the starter-sector and 10a the hand lever of the starting device of the gear 9 for the motor 1. A shaft 11 is fixed at 11a to the brake drum of the driving gear and journaled at 11b in a ball bearing. A sprocket wheel 12 keyed on shaft 11 is connected by a chain 13 with a sprocket wheel 14 of the propelling roller 15. The journals of the propelling roller 15 are journaled at the points 15a by means of ball bearings in the carrying straps 16. These carrying straps are connected to the sled frame 4 by chain-tighteners 17 and unsupported springs 18. Rotatable springstraps 18a are connected with each other by a shaft 18b. At the point 19a a hand lever 19 is hingedly connected to the left springstrap 18a, a claw 19b of said hand lever being pressed from the side by a blade spring 20 into engagement with the teeth of a sector 21. When the hand lever 19 is disengaged from the teeth of the sector 21 and pulled upward, the roller 15 is resiliently pressed against the road by the unsupported spring 18, whereupon the claw 19b of the hand lever 19 is allowed to engage again with the teeth of the sector 21. When the hand lever 19 is however depressed, the roller 15 is lifted from the road so that it rotates freely. The roller 15 has angular calks 22 which are of greater depths at the points 22a and gradually decrease to lesser depths at the points 22b. Owing to the angular shape of the calks 22 they engage successively with the ground. Each calk remains in the operative position until some following calks have come into the operative position, whereby a regular propelling of the sled is obtained and the further advantage is ensured that the snow is rejected at the rotation of the roller in rearward direction and to the sides. A hood 23 covering the roller carries a device 23a designed to hold disc wheels. Brake claws 24 are connected by hinged rods 24a to a brake lever 24b. 25a is a hand lever of the control segment 25 which is connected with the gear by means of hinged rods 25b. 26 is a pedal lever connected by a hinged rod 26a with the driving gear brake. 27 is a benzine tank and 27a the pipe from the same. 28 is an oil tank and 28a the pipe from the same. When the pedals 3 any 26 are not being used, the feet of the operator may rest upon the foot rests 3a.

Figs. 3 and 4 show that the front part of the motor sled is hingedly connected to the rear part of the same at the points 29 and that the runners 4a for the front portion are composed of two parts and hingedly connected at the points 30 by a gauge rod 30a, in order to ensure parallel gauging of the front portion of the sled. The steering wheel 31 is connected by a steering lever 32 and push rod 33 to the front part of the left runner. When the steering wheel 31 is rotated, the push rod 33 pushes the left runner to the left or to the right so that the front runner portion forms an angle with the frame 4 and the sled can move in a curve. The sled is fitted with wheels 34 so that it can be used also on snow free roads. The wheels are mounted on hubs 35 provided on the sides of the propeller roller. The operation of the motor sled is as follows:

After the driving gear 9 has been placed in neutral position, the motor 1 is started by operating the hand lever 10a of the gear-starting mechanism 10, so that the motor runs idle. The roller 15 is then strongly pressed against the ground with the aid of the operating lever 19. The clutch 5 is disengaged by depressing of the clutch pedal 3 with the right foot, whereupon the slow speed is engaged in the driving gear 9 by means of the control lever 25a. When the clutch pedal 3 is released, the clutch is engaged and the sprocket wheel 14 of the roller 15 is rotated by the Cardan 7 and the driving gear 9 through the intermediary of the chain 13 so that the roller 15 rotates and propels the slide as its calks 22 penetrate successively into the snow.

To propel the sled by means of the wheels 34 the propelling roller 15 is lifted from the ground and a wheel 34 is mounted on each hub 35 at the rear of the body and secured in position by screws and nuts, whereupon the roller is lowered so that the sled is resting on the wheels. The bolt in the left hinge 30 is unscrewed and removed, so that the gauge rod 30a can be moved on the right hinge 30 to forward position relative to the front runners, whereupon a third disc wheel 34 is mounted on the hub 35 of the gauge rod 30a and secured in position. The gauge rod 30a is inserted in the left hinge 30, the bolt screwed in and the sled is mounted on the wheels ready for use. When the motor is then started, the sled can run on snow-free roads like a motor-car.

I claim:—

In a motor sled, a frame having upper and lower side bars, perpendicular connecting bars for the side bars of each pair, a motor propelled roller, leaf springs having a journal support at one end on the perpendicular bars and supporting the roller at their other ends, a hand lever and cooperating rack segment with the lever in communication with the journalled ends of the springs whereby the roller may be pressed against a road with the desired pressure and so maintained by the lever and associated rack segment.

In testimony whereof I affix my signature.

RICHARD JOSEF WEISSER.